March 24, 1970     E. WESENER     3,502,038

AUTOMATIC TRACK CONVEYOR INSTALLATION

Filed March 27, 1967     7 Sheets-Sheet 1

INVENTOR.
Erich WESENER
BY Jacobi & Davidson
Attorneys

March 24, 1970   E. WESENER   3,502,038
AUTOMATIC TRACK CONVEYOR INSTALLATION
Filed March 27, 1967   7 Sheets-Sheet 3

INVENTOR.
Erich Wesener
BY Jacobi & Davidson
Attorneys

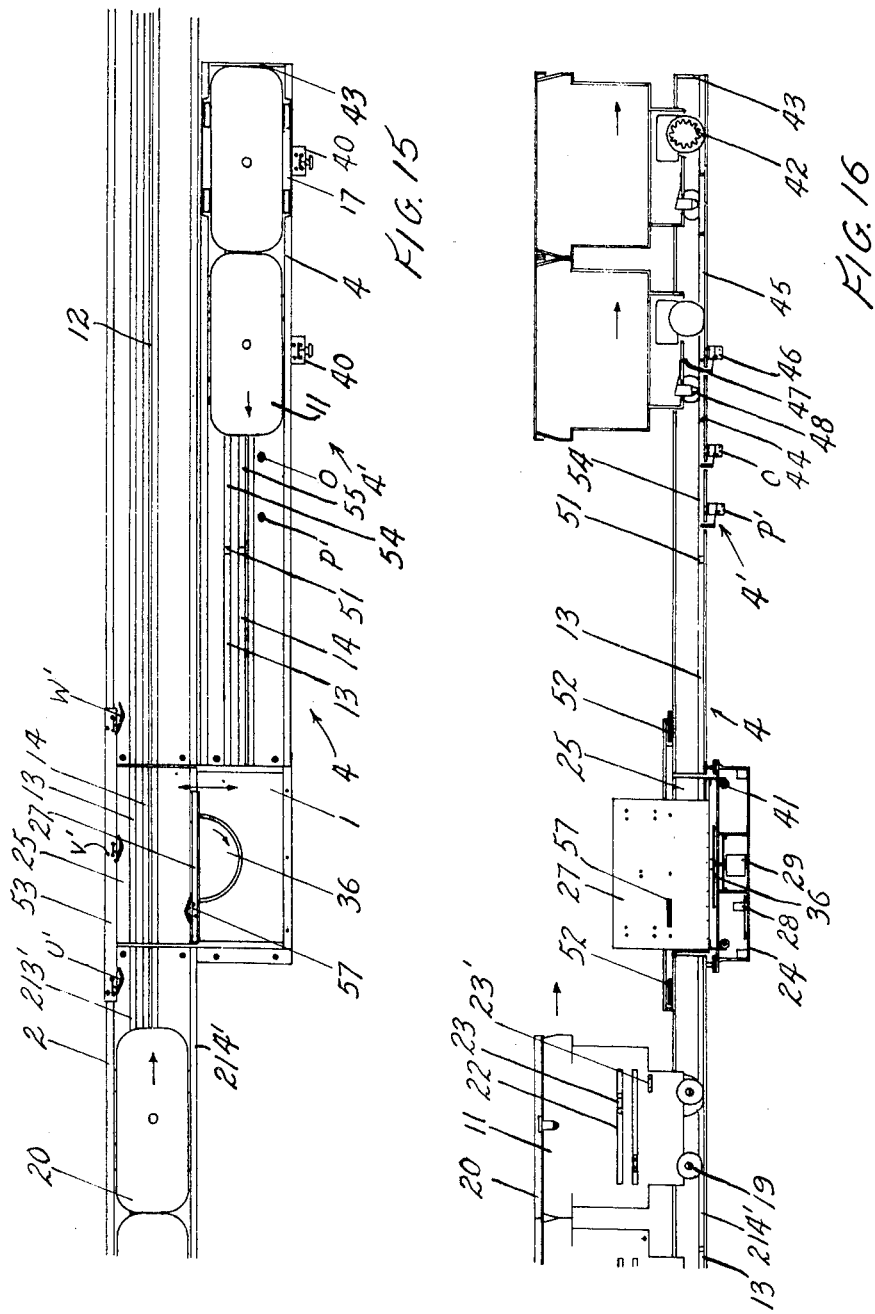

March 24, 1970  E. WESENER  3,502,038
AUTOMATIC TRACK CONVEYOR INSTALLATION
Filed March 27, 1967  7 Sheets-Sheet 7

INVENTOR.
ERICH WESENER
BY Jacobi & Davidson
Attorneys

United States Patent Office 3,502,038
Patented Mar. 24, 1970

3,502,038
AUTOMATIC TRACK CONVEYOR INSTALLATION
Erich Wesener, Munich, Germany, assignor to Buro Patent AG., Glarus, Switzerland, a corporation of Switzerland
Continuation-in-part of application Ser. No. 443,714, Mar. 29, 1965. This application Mar. 27, 1967, Ser. No. 626,197
Claims priority, application Switzerland, Mar. 29, 1966, 4,480/66
Int. Cl. B61j *3/00;* B61k *1/00;* B61b *5/02*
U.S. Cl. 104—88                                      24 Claims

ABSTRACT OF THE DISCLOSURE

An automatic transportation system, utilizing both horizontal and vertical track sections, includes a transfer switch adapted to sense coded signals on passing carriages for automatically switching same to specified track sections in response thereto.

---

The present application is a continuation-in-part of my copending application Ser. No. 443,714 filed Mar. 29, 1965, now U.S. Patent No. 3,340,821.

BACKGROUND OF THE INVENTION

The present invention relates to an automatic transportation system with a set of tracks incorporating horizontal and/or vertical rail sections. Each rail section includes a base portion, lateral guide portions with oppositely directed or confronting guide shoulders at their upper edge, and rack means mounted along with two current rails on the base portion. Additionally, this system includes self-propelled electrically driven transport cars or carriages and automatically operable branching means for selectively transferring a car from one track section to another under the control of scanning or reading means for sensing code markings arranged on the transport cars or carriages.

Conventional systems of this type exhibit a series of drawbacks. Thus, for instance, they are very complicated and require an entire array of different components and devices. The switches of such conveyor installations must be individually adapted to existing conditions so that special switch elements are needed for the different operations which occur in this kind of plan.

Means for automatically operating such track switches are known in the art. To this end, these switches may be automatically controlled from a central station, or else the transport car or carriage is equipped with a so-called target or destination marking which is scanned or read out in front of the switch by means of a scanning or reading device and can be stored in the switch. Apart from the fact that such storage mechanisms are expensive and quite sensitive in operation, it is not possible with such conveyor installation to transfer carriages out of a dense column, that is, to switch individual carriages following one another quite closely. It is for this reason that the known conveyor installations require block paths in order to prevent collisions. Consequently, the installation on the one hand becomes complicated and, on the other hand, is of limited capacity.

SUMMARY OF THE INVENTION

Accordingly, it is a primary object of the present invention to provide an improved automatic track-type transportation system which overcomes the shortcomings of the prior-art structures as explained above.

Another, more specific object of the present invention is to provide an improved automatic system of this type which is relatively simple in construction, extremely reliable in operation, capable of executing a great number of different variations in operation in an extremely simple manner and, in particular, adapted to operate with carriages which travel closely together wherefore its performance is extremely economical.

In a system according to my invention, the scanning or reading means are carried on the movable switch portion or track support and the code markings are read or scanned during travel of the cars, the tracks including sections enabling the cars to be removed from and reintroduced into the transport path at a junction point. The entire arrangement is so constructed that the branching means are effecive with not only horizontal but also vertical orientation as well as with isolated carriages and with carriages moving in a dense column.

The arrangement of the reading or scanning means in the zone of the movable switch portion or track section of the branching means is a basic requirement for the exceptionally simple construction of a track junction capable of serving a variety of uses. This arrangement of the reading means renders it possible to control the shuttle-type track switch when the car is already standing upon the movable portion of the switch. The car thus directly controls the transfer operations. Consequently, storage devices and central switching stations are made superfluous.

Moreover, the conveyor system according to my invention can be randomly equipped with junction points or branching means so long as the carriages are provided with code markings by means of which they control the transfer switch.

The code markings can be provided with the aid of two permanent magnets and/or electromagnets which are spatially arranged on the carriages in accordance with the information to be transmitted to the sensing means. In order to be settable to indicate different destinations, the selector magnets can be displaceable. Magnetic test switches are preferably used for the reading or scanning means. In order to render possible scanning or reading during travel, the code markings and the reading means advantageously possess reference markers enabling the code markings to be read only at the moment that these reference markers register with each other.

The transfer switch can be constructed in a variety of ways. Thus, for instance, the movable portion of the switch can be designed as a rotatable, pivotable or translatable member. Particularly in the latter instance, the mobility of the movable switch portion need not be limited to a horizontal direction between two parallel track sections but can also exist in the vertical direction between two superimposed rail or track sections.

The reading means can be arranged adjacent the movable portion or shuttle of the transfer switch, i.e., upon its guide frame, in which case separate reading means must be provided for each position of the movable portion. However, it is preferable to mount the reading means directly on the shuttle for displacement therewith. This requires but a single reading means and insures that even if the movable track section is not exactly in its proper position, the correlation of the reading means with the cars is still satisfactory.

In order to prevent movement of a car onto an occupied shuttle and/or onto one which is not located in the proper position for receiving the conveyor car, it is advantageous to provide the approach track or tracks of a junction point with monitoring means coupled with the control circuit of the shuttle to stop incoming cars as long as the switch is occupied and/or not in proper alignment with a fixed track section. These monitoring means can be of a mechanical or electrical nature. Thus, for instance, it is possible to let the control circuit operate stop members at the fixed track section acting upon switching and/or braking elements on the transport cars or carriages.

The shuttle can be provided, in the same manner as the approach track section, with arresting means for stopping the carriages on the movable track section; means can also be provided for restarting the carriages after the switch has completed its change of position.

Advantageously, the transfer mechanism includes means for returning the shuttle to its starting or home position after the switch has completed its desired changeover. Consequently, it is possible to have the shuttle interconnect two fixed track sections when the mobile track section is in its starting or home position. In that case, it is desirable to connect the switch control to the track sections in such a manner that no shift occurs in the absence of coincidence between the code markings of oncoming cars and the code markings present at the reading means; the cars then passing unobstructedly straight through the junction.

The shuttle-control mechanism can be equipped with a series of safety devices which serve to maintain a trouble-free operation of the conveyor installation. Accordingly, its drive mechanism can be locked in such a manner that a switching operation is initiated only after the previous one has been terminated. Furthermore, means can be provided which, when power failure occurs, maintain an initiated switching condition until, upon return of the power, this switching operation can be terminated. Additionally, I prefer to provide the transfer switch with means for stopping the cars if the connecting track section is occupied or for conducting such cars to a free connecting track section, preferably in the main line.

In accordance with a further feature of my improved transfer switch, it is possible to provide means at the access or approach track sections which can be actuated by a passing car or by hand at some other location of the track system for recalling the movable track section to its off-normal position, i.e. into line with a fixed secondary track section, whereupon a car waiting on the latter section can be restarted to move onto the mobile track section for transfer to a fixed primary track section.

The aforedescribed transfer switch can also be arranged vertically in line with an ascending or descending track section.

It has been found particularly advantageous, for the transfer of cars out of or into a descending track section, to provide holding means at the approach or incoming track section for preventing a downward movement of the stopped cars. This can be accomplished by means of a movable mechanical brake or by electrical braking as, for instance, by induction or by short-circuiting the armature of an electric motor aboard the car which is provided with a permanent excitation. It is also advantageous to deliver to the motor of the waiting car a countercurrent which is of such a magnitude that it just balances the force of gravity, thereby holding the car in suspension.

As will be more fully explained hereinafter in conjunction with specific exemplary embodiments, the movable track support of my improved transfer switch can be used in a great many different ways in a conveyor installation. This support can be prefabricated with all the possibly required switching devices, which then during mounting can be connected in the desired combination by, for instance, simple plug connections.

BRIEF DESCRIPTION OF THE DRAWING

The invention will be better understood, and objects other than those set forth above will become apparent, from the following detailed description thereof given with reference to the annexed drawing wherein:

FIG. 15 is a top plan view which schematically illustrates the shuttle co-operating with a receiving track section;

FIG. 16 is a side-elevational view of the arrangement shown in FIG. 15;

DESCRIPTION OF THE PREFERRED EMBODIMENTS

Figure 1:
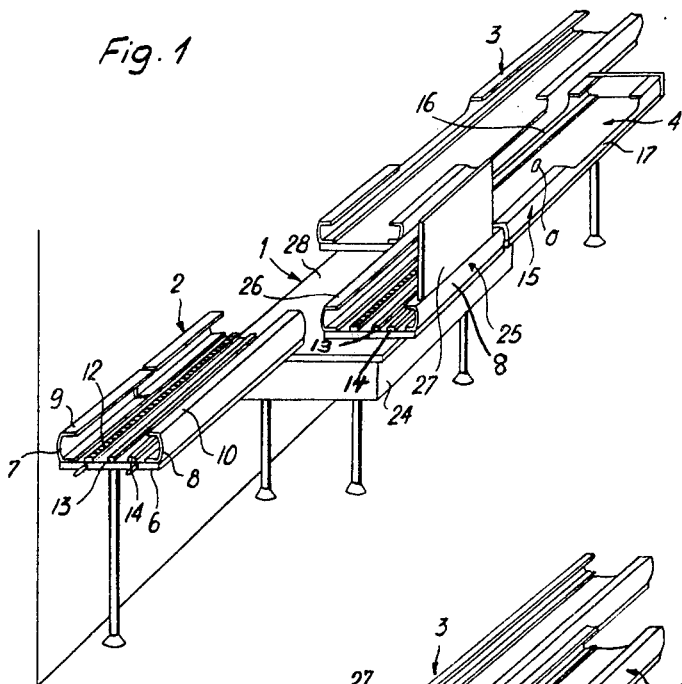
FIG. 1 is a perspective view schematically illustrating a track section provided with a shuttle and an adjoining station.
Figure 2:
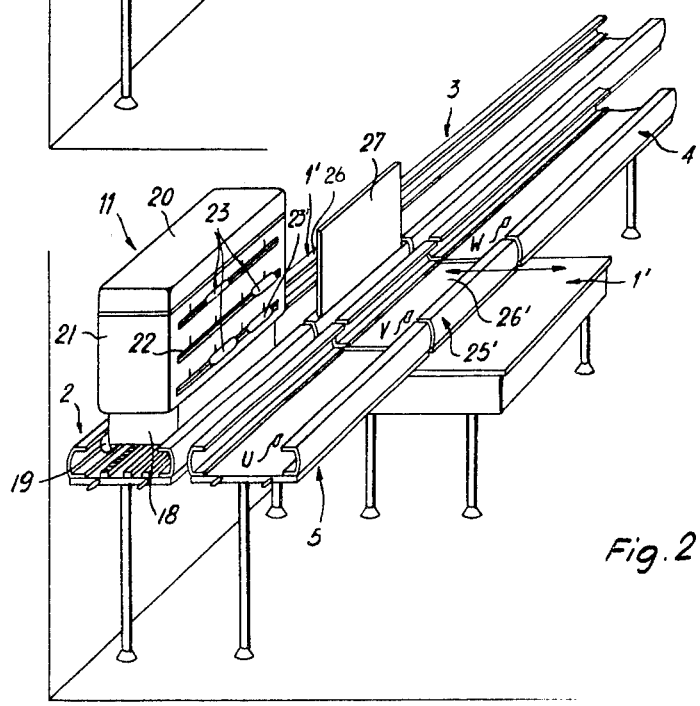
FIG. 2 similarly illustrated a junction between two parallel track sections interconnected by a shuttle constructed as a double switch.

In FIG. 1 I have shown an embodiment of a transfer switch 1 mounted between a starting track section 2 and a departure track section 3. This track-supporting element or switch 1 can be displaced into alignment with a fixed track section 4 which in the present instance is constructed as a receiving station or siding. In FIG. 2 the junction is extended to provide a double switch 1' alternately disposed between two parallel pairs of track sections 2, 3 and 4, 5.

FIGS. 1 and 2 clearly indicate the construction and configuration of the track sections 2, 3, 4 and 5. They consist each of a base portion 6 secured to lateral guide portions 7 and 8. The upper edges of the guide portions 7 and 8 are equipped with confronting guide shoulders 9 and 10, respectively. In order that a transport car or carriage 11 can exert traction upon the tracks with both horizontal and vertical orientation of the guide tracks 2, 3, 4 and 5, the latter advantageously comprise racks 12 at the respective base portion 6. At the base portion 6 there are arranged two current rails 13, 14. The guide rails or tracks 2, 3, 4 and 5 of the conveyor installation advantageously consists of individual sections which, in appropriate manner, can be interconnected by plug connections or the like and can then be secured in any convenient manner. Additionally, at those regions where it is desired to remove a car 11 from the track, for instance from the track section 4 at the station 15, the guide shoulders 9 and 10 thereof can be provided with recesses 16 and 17 which correspond approximately to the length of a car 11.

The car 11 depicted in FIG. 2 comprises a drive unit 18 which contains an electric motor, preferably a direct-current motor, a preferably self-locking transmission and contacts 48 (FIG. 16) forming a current collector or tap. These components are well known in the motor art and therefore will not be considered in any greater detail. Wheels 19 are mounted laterally of the drive unit 18. The dimension of these wheels 19 is such that they are guided without any great play in the channels formed by the base portion 6, the lateral guide portions 7, 8 and the guide shoulders 8, 9. Additionally, the drive mechanism 18 is equipped at its underside with a non-illustrated pinion which meshes with the rack 12. The electric motor is advantageously constructed as a permanently excited motor so that it can be easily braked by short-circuiting its armature winding.

Above the drive unit 18 there is arranged a container 21 for the goods to be transported, preferably equipped with a cover member 20. Along one longitudinal side of this container 21 there are displaceably arranged, in guide grooves 22, permanent magnets 23 which serve for the establishment of a selected code marking. One of these permanent magnets, designated 23′, is fixedly arranged and serves as a reference marker.

The transfer element 1 depicted in FIG. 1 possesses a housing or guide frame 24 which also serves as a support for the adjoining track sections 2, 3 and 4. A shuttle or slider 25 constittues the movable portion of this switch 1. Shuttle 25 is displaceable between the track sections 2, 3 and 4 in a direction substantially perpendicular thereto and in a plane formed by these tracks. The displaceable switch portion 25 is so mounted upon the housing or guide frame 24 as to have only one degree of freedom of movement, being thus exactly guided and held against removal in a direction perpendicular to its plane of motion. This construction is particularly important for the arrangement of the switch at vertical track sections.

The shuttle 25 supports a track section 26 having the same guide-rail profile, including a rack and current-supplying rails, as the remaining track sections 2, 3 and 4, so that the car 11 is also exactly guided on the track section carried by this slider. An extension of one of the lateral guide portions of shuttle 25 is equipped with scanning or reading means 27, more fully described hereinafter, for sensing the code markings 23 on car 11. This sensor 27 is operatively coupled with control means 28, which is advantageously received in the guide frame 24, the details of operation and structure of which will be more fully set forth below.

The double switch 1′ of FIG. 2 comprises a slider 25′ provided with a further guide-rail piece 26′ in such a manner that the rigidly interconnected rail pieces 26 and 26′ concurrently complement the primary and secondary track sections 2, 3 and 4, 5, respectively, to form a pair of continuous parallel tracks. The construction of the double switch 1′, insofar as its essential components are concerned, generally corresponds to the construction of the single switch 1. The operation of both switches will be more fully explained below.

Figure 3:
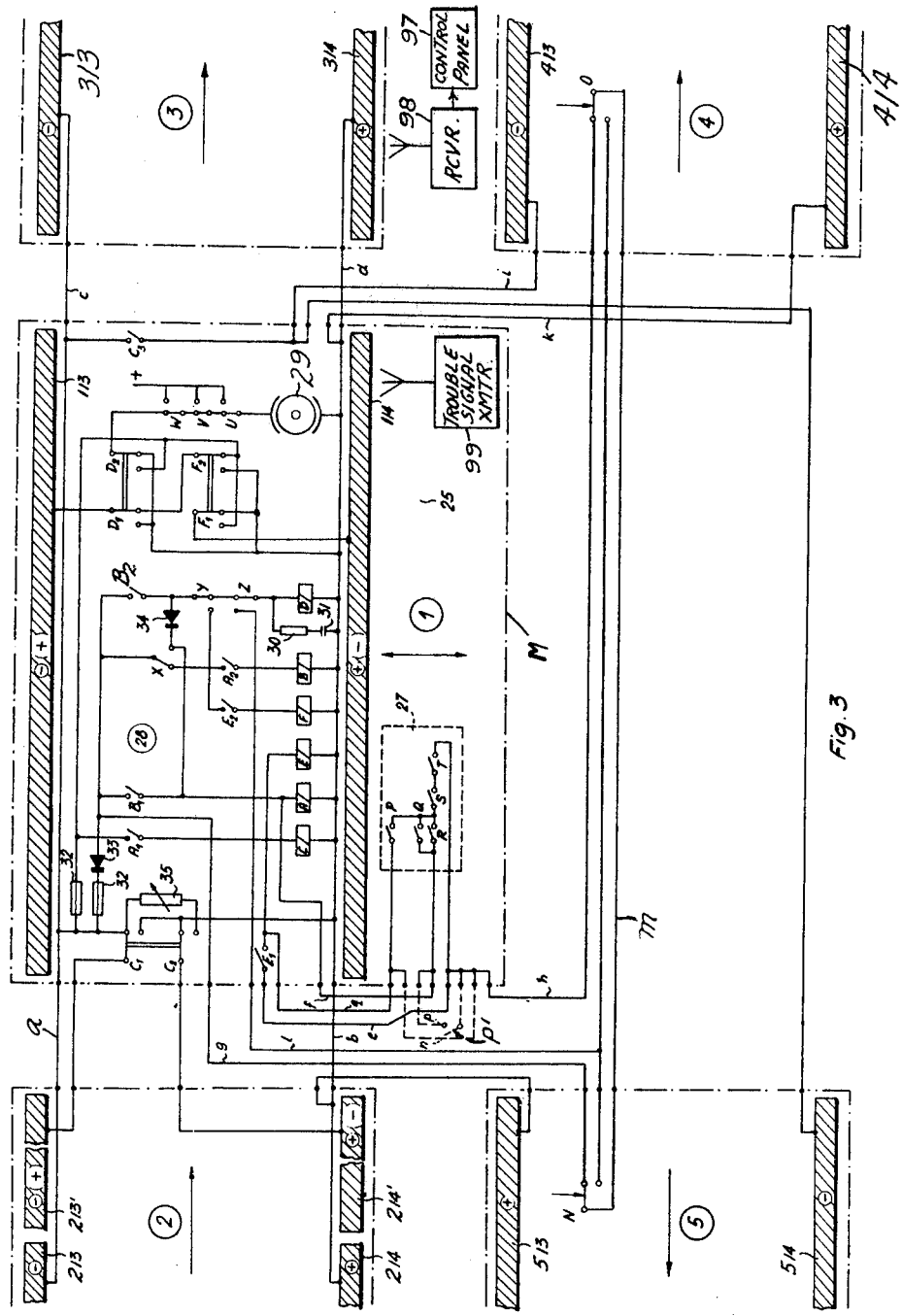
FIG. 3 is a circuit diagram of a movable track support disposed at a junction between a main line and two branch or auxiliary lines.

In FIG. 3 there is shown the circuit arrangement for the control mechanism 28 of transfer switch 1 with adjoining guide rails or track sections 2, 3 and 4, 5. The counterparts of rail sections 13 and 14, FIG. 1, have been designated 113 and 114 for switch 1, 213 and 214 for track section 2, 313 and 314 for track section 4, 413 and 414 for track section 4, and 513 and 514 for track section 5. The slider 25 of the switch 1 is shown positioned between the arrival and departure track sections 2 and 3. The individual components, of which for the sake of simplicity only the current rails or bus bars 113 and 114 have been depicted, together with the control or switching devices have been enclosed in a phantom-line box M.

It will be recognized that at the incoming track section 2 the current rails 213 and 214 are interrupted so that there exist separate bus-bar sections 213′ and 214′. For the moment, we shall disregard the separate rail section 214′ and assume that rail 214 is a continuous bus bar, as will usually be the case with horizontal track portions. Bus-bar section 213′, connected to the control device 28 of the switch 1 in a manner explained hereinafter, does not receive any operating potential when the switch 1 (FIG. 1) is occupied or is not located in a receiving position, in order to stop subsequent cars 11. If the cars 11 have a permanent field excitation, rail 213′ can be short-circuited to rail 14 so as to brake an oncoming car 11. Depending upon the frequency of utilization of the track section, i.e. upon the volume of traffic which passes thereover, it is possible to have the length of the separate current rail 213′ range between one and several car lengths.

Since the switch 1 is constructed as a structural element which should be combined in a simple manner with the track sections 2, 3, 4 and 5, the junctions and connections between the switch 1 and the track sections can be produced by connecting their respective conductors, led out from a panel, with similar junctions or connections at the guide rails, e.g. by means of plug connectors or by soldering. Accordingly, the current rails 213 and 214 of the approach track section 2 can be, for instance, connected via leads $a$ and $b$ with the main conductors of the switch 1 and, further, via conductors $c$ and $d$ with the current rails 313 and 314 of the departure track 3.

The sensing means 27 may be advantageously designed as an exchangeable unit which can be connected to the control mechanism 28 through the agency of detachable conductors $e$ and $f$. In order to facilitate adjustment of the sensing means 27 to change the code to be detected, a set of magnetic switches P, Q, R, S, T forming part of this sensor may be displaceably mounted. In any event, one of the magnetic switches is fixedly positioned and serves as a reference marker for the scanning of a passing carriage.

The switch 1 is advantageously constructed and connected in such a manner that its slider or shuttle 25 has a home or starting position to which it returns after completing the desired track-switching operation. This home position is preferably located in the main line 2, 3 in such a manner that a car 11 which comes from the approach track section 2, and whose coding does not correspond with that set at the reading means 27, passes straight through the switch 1 without triggering any track-switching operation and moves onto the departure track section 3.

The structure and function of the switch 1 and the control device 28 will be explained more fully in conjunction with a given example. Specifically, it is assumed that a car 11 arrives from the approach track section 2 and moves onto the shuttle 25. Immediately thereafter, the code markings 23, 23′ are sensed by the reading means 27. It will be further assumed that the scanner 27 has determined that such code markings 23, 23′ correspond to or coincide with the setting of the magnetic test switches R, S, T.

Now, the magnetic switches R, S and T close for a short time and a current can flow via conductors $f$, $g$, $h$ through a relay A which actuates a relay C through the agency of its contact $A_1$. A contact $C_1$ of the relay C in its rest position connects the separate bus-bar section 213′ to the current rails 213 and 313 and in its energized condition bridges the rails 213′ and 214. At the same time a contact $C_3$ is closed by the relay C and energizes the current rail 413 of siding 4 via a conductor $i$. The second current rail 414 of the track section 4 is continuously connected via a conductor $k$ to the current rails 214, 314 of the main line.

By means of the relay A a relay B is simultaneously energized via its contact $A_2$. This relay B, on the one hand, via its contact $B_1$ locks the relay A and, on the other hand, energizes a relay D via its contact $B_2$. Relay D possesses two contacts $D_1$ and $D_2$, contact $D_1$ in its rest position connecting the current rail 113 to potential on rails 213 and 214, as shown, while contact $D_2$ short-circuits the drive motor 29 for the shuttle 25 and thereby brakes same since the drive motor 29 is provided with a permanently excited field. After energization of the relay D the current rails 113 and 114 are short-circuited via the contact $D_1$, the car 11 being thus arrested on slider 25 while the drive motor 29 is started via the contact $D_2$.

Immediately upon the starting of the drive motor 29 a limit switch X is thrown. As a result, the relay B is de-energized, yet the relays A and D now receive current directly via the switch X and therefore remain energized. Since the limit switch X is dependent only upon the position of the shuttle 25 or its drive, it retains its position also in the event of a power failure. When power is restored, the circuits which were in existence at the time of the temporary power failure are re-established and the switching operation can be completed. Moreover, it should be understood that in lieu of the limit switch X it would also be possible to employ current-surge or remanence relays.

When the shuttle 25 has reached its off-normal position, two further limit switches Y and Z are actuated. Consequently, the relay D is de-energized and the drive motor 29 stops. The release of relay D energizes the current rails 113, 114 via its contact $D_1$, and the contact $D_2$ simultaneously brakes the drive motor 29. Since the current now has the same polarity as in the initial or starting situation, the car 11 moves off the shuttle 25 in its previous direction of travel, i.e. to the right as viewed in FIG. 3.

As soon as the car 11 has left the shuttle 25, it trips a monitoring switch O whereby the relay D once again is excited via a conductor $l$ and the limit switch Z to reverse its contacts $D_1$ and $D_2$. Consequently, the drive motor 29 again begins to run and the current rails 113, 114 of the shuttle 25 are short-circuited. In order to somewhat delay the starting of the drive motor 29, there is connected in parallel with the relay D a time-constant network in the form of a resistor 30 and a capacitor 31.

Now, the slider 25 moves back into its home position until it actuates the limit switch X. During the short time required for the reversal of switch X, the other existing circuits are deenergized and the original starting condition is again established, the switch 1 being thus free to receive a further car 11.

Apart from several circuit components which are required for technical reasons, such as fuses 32 and diodes 33, 34 for determining the direction of current flow, the switch 1 also possesses a number of circuit elements adapting it for different operations.

More specifically, there is provided at the scanning or reading means 27 an additional magnetic switch Q which can be operated individually or jointly with the switch R, so that the switch 1 responds to a larger number of code combinations.

On the other hand, a magnetic switch P of the reading means 27 serves to back out a car 11 which arrived at the junction M by forward travel, i.e. from the left on FIG. 3. To this end, closure of the magnetic switch P jointly with switches S and T energizes, via a conductor $g$, a relay E which possesses two contacts $E_1$ and $E_2$. By means of the contact $E_1$ the relay E locks to potential on lead $f$ independently of switch P and by means of the contact $E_2$ it stores the information concerning the direction of departure which has been read out by the reading means 27 until the shuttle 25 has reached its off-normal position whereupon the stored information becomes effective via the limit switch Y and energizes a switchover relay F which, at armatures $F_1$ and $F_2$, reverses the polarity of the current rails 113, 114 of the switch 1.

A monitoring switch N in the track section 5 operates upon the rearward transfer of a car 11. This switch N, similar to the switch O used during forward transfer, serves on the one hand to indicate to the control device 28 that the car 11 has left the shuttle 25 and on the other hand to bring about the return of the shuttle 25 to its home position. The switches N, O also serve to prevent a return of the switch 1 upon being simultaneously actuated, i.e. if the adjoining track sections 4, 5 are both occupied. The switches N, O are connected via the conductor $f$ and conductors $m$ and $h$ in series between the current supply and the scanning or reading means 27.

When the switch 1 is installed in a descending vertical track section, it is generally not sufficient to brake oncoming cars 11 by short-circuiting the current rails to arrest these cars. Rather, in such case, the insulated rail sections 213', 214' (extending advantageously over the length of one car) are energized with inverted polarity to generate a countercurrent which is just large enough to prevent a car 11 from climbing rearwardly up the track. To this end, the current rail 214' is connected to an armature $C_2$ of the relay C. The back contact of this relay armature is connected to rail 214 while the first contact thereof is connected to rail 213 by way of a control resistor 35.

If the transfer operation is to be invariably accompanied by a change of direction as previously considered, such reversal can be obtained independently of the position of the magnetic switches T, S, P of the reading means 27 by an optional connection $n$ shown in dotted lines.

In order to transfer a car 11 from a branch or auxiliary track to a main-line track it is necessary to recall the shuttle 25 into alignment with the auxiliary track or siding. This can be accomplished, either manually or by means of the car 11 as more fully described hereinafter, by shorting the reading means 27 via a connection $p$, closable by a recall switch P', as also shown in dotted lines.

When the track junction is a double switch 1' in accordance with FIG. 2, one track section 26' of the slider 25' merely serves to bridge two track sections 4 and 5, whereas the other track section 26 thereof serves to carry out the transfer operations. Accordingly, the current rails of the second movable track section 26' are permanently or invariably connected in accordance with the connection of the current rails of sections 4 and 5. In order to prevent the double switch 1' from carrying out a transfer operation during the time that the other tracks 4, 26, 5 are occupied, supervisory microswitches U, V, W are mounted at suitable locations in these track sections. These microswitches U, V, W immediately shut down the drive for the switch when contacted by a car and additionally short-circuit such drive, thus braking the switch motor 29.

Figure 4:
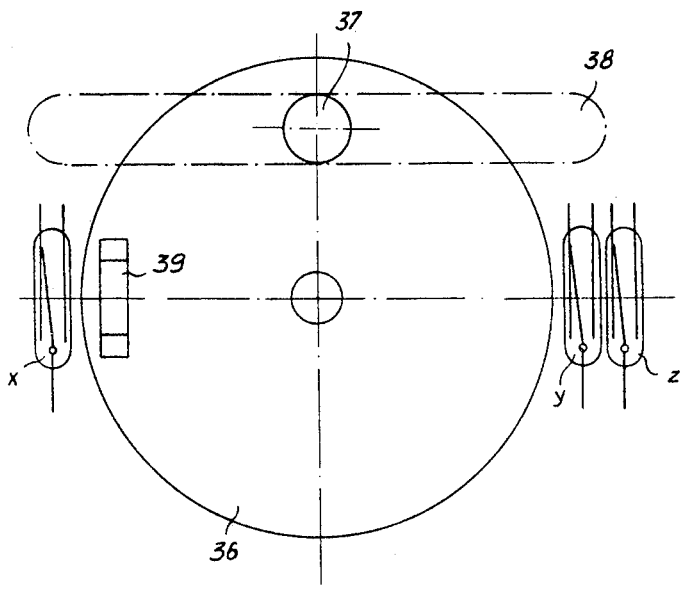
FIG. 4 schematically illustrates the drive means for the movable switch portion and associated limit switches for the system of FIG. 3.

FIG. 4 schematically depicts a preferred embodiment of the drive for the slider 25. This drive includes a disk 36 which is coupled via a geared transmission with motor 29 (FIG. 3) and which carries an eccentric 37. The eccentric 37 engages in an elongate slot 38 provided on the shuttle 25 and thereby entrains the latter. This arrangement is particularly advantageous since it enables a soft starting and stopping of the shuttle 25. Near the disk 36 the limit switches X, Y and Z are mounted on the housing or guide portion 24 (FIG. 1). These switches are advantageously magnetic switches which are actuated by a permanent magnet 39 in the manner described heretofore. This permanent magnet 39 is fixedly mounted on the disk 36.

The aforedescribed movable track support or switch 1, 1' is characterized by its extremely simple construction, small dimensions, great operational reliability and its large variety of different operations and uses. Furthermore, this structural element does not require any central switching stations, storage units or block stations, thus greatly simplifying the overall conveyor installation.

Advantageously, the movable track support is manufactured as a unit with all the different switching devices which, upon installation, can be selectively connected in accordance with the desired function.

In FIGS. 5 to 13 there are depicted different installation and operation possibilities. The solid-line arrow designates the main-line direction of travel and the broken-line arrow denotes the siding or auxiliary track from which and into which transfer of cars can be undertaken. The auxiliary tracks or sidings 4, 5 can also represent a station which is suitable for the reception of one or more cars 11. In each instance the shuttles 25 or 25' are shown in their home positions.

Figure 5:
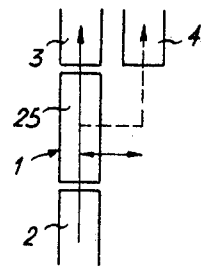
FIGS. 5 to 13 schematically illustrate different installation and operational possibilities for the transfer switch of FIG. 3.

More specifically, FIG. 5 illustrates the forward transfer from a main line 2, 3 onto an auxiliary track 4. The auxiliary track 4 could be a station similar to the embodiment of FIG. 1 or a full-fledged branch line.

Figure 6:
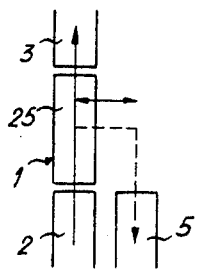
Figure 7:
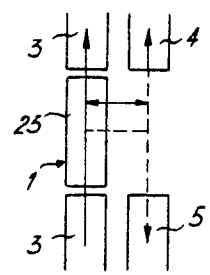

FIG. 6 schematically depicts the rearward transfer from the track sections 2, 3 to an auxiliary or side track 5. The two operating possibilities considered with respect to FIGS. 5 and 6 have been combined in the arrangement of FIG. 7 which, accordingly, functions in the manner described with reference to FIG. 3.

Figure 8:
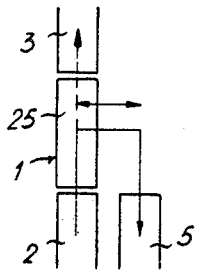

In FIG. 8 all the arriving cars 11 are transferred to track 5, with reversal of direction, except those whose code markings correspond with the setting of code markings of the reading means 27 and which are allowed to pass straight through the switch 1. In this instance the reading means 27 triggers the control device 28 in the absence of a matching code, i.e. upon closure of reference switch R while test switches S and T are open.

Figure 9:
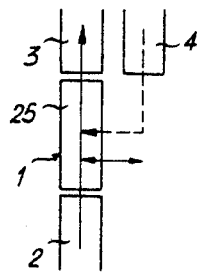
Figure 10:
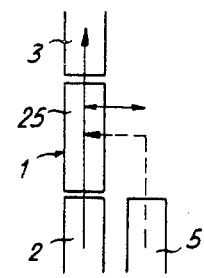

FIGS. 9 and 10 respectively show rearward and forward transfer from a branch or auxiliary track 4 or 5 to the main-line track sections 2, 3. In this case the shuttle 25 must be recalled manually or by the cars themselves. In the approach or access track sections 2, 4, 5 in front of the switch 1 there must be provided in each case the above-described arresting means to prevent movement of a car onto an occupied shuttle or onto one that is not located in the proper receiving position.

Figure 11:
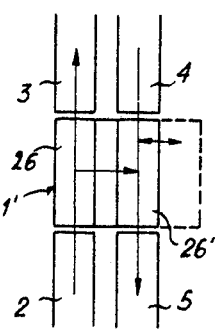
Figure 12:
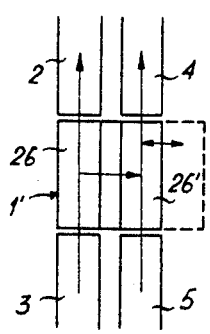

FIGS. 11 and 12 (see also FIG. 2) show a double switch 1' inserted between two throughgoing tracks 2, 3 and 4, 5. The direction of travel over these tracks is opposite in the first case and in the same direction in the second instance. Of the two transfer tracks 26 and 26' only the track 26 is active whereas the other track 26' is passive and only serves to interconnect the tract sections 4 and 5 when the shuttle 25 is located in its home position.

By means of the double switch 1' it is possible to transfer both in the forward and in the rearward direction. Furthermore, with a double switch 1' it is also possible to couple throughgoing tracks in a very simple manner. Consequently, the carriages may be shifted from either throughgoing track to the other, even if both tracks are concurrently traversed by a column of tightly spaced cars, since the column will be automatically stopped in front of the double switch 1' at the transport track into which car transfer is about to be undertaken and for the period of such transfer.

Figure 13:
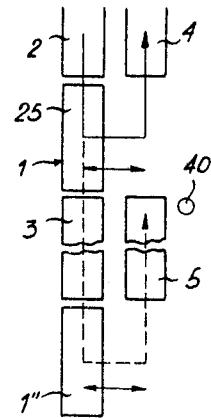

FIG. 13 depicts the insertion of a switch 1 between a main-line track 2 and a terminal track 3 which is constructed as a station. The main line from track 2 continues over the track 4 with the switch 1 serving as a reversing device. If the station 3 should accommodate a number of carriages or transport cars 11 and if the available space is not quite sufficient for adding a simple extension, then this station can be equipped in the depicted manner with a switch 1" which is also constructed as a reversing means. This switch 1" connects the terminal section 3 with a siding 5 which terminates in front of the switch 1. The station formed by the tracks 3, 5 and the reversing switch 1" need only be so constructed that the cars automatically pass over the connecting track 3 to the track 5 by means of the switch 1" and remain standing in front of the switch 1. The cars can then be automatically retransferred into the main line if shuttle 25 is recalled by means of a button 40 which allows the starting of the sidetracked car. The following cars automatically move up into the place which has become free by transfer of the departing car.

The various switching possibilities described with reference to FIGS. 5 to 12 can be realized not only with horizontal conveyor tracks but also with a vertical track orientation.

Figure 14:
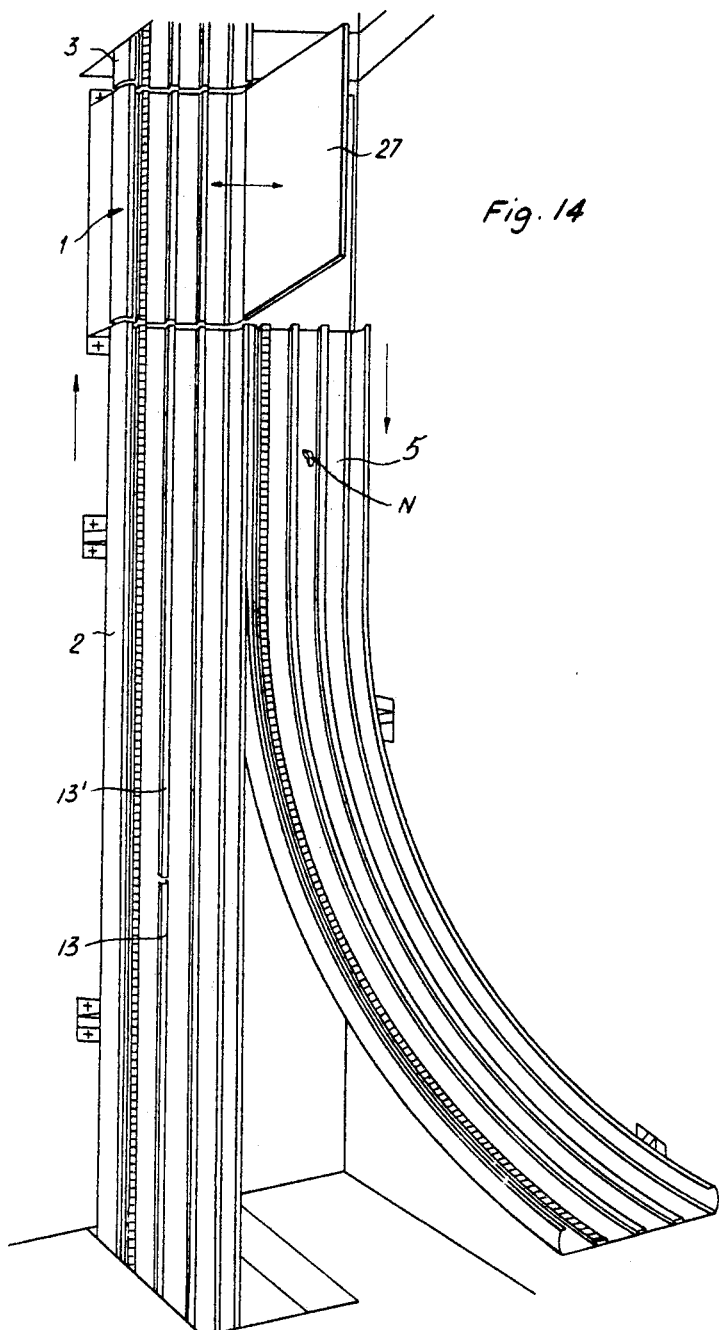
FIG. 14 is a fragmentary perspective view depicting a shuttle for transferring transport cars or carriages out of a vertical downward track.

In FIG. 14 there is depicted a vertical arrangement of a track system 2, 3 which is equipped with a switch 1 serving for the rearward transfer to a curved track 5 and/or for the forward transfer from the curved track 5 to the vertical conveyor tracks 2, 3. In front of the switch 1 there is disposed the track portion 13' which is insulated from the current rail 13 and which constitutes a waiting zone for oncoming cars. In the auxiliary or branch track 5 there is shown the supervisory or monitoring switch N which, on the one hand, signals to the control device 28 the departure of a car 11 from the switch 1 and, on the other hand, indicates an occupancy of the track section 5. In the latter case it switches off the control circuit 28 of the switch 1 so that all cars 11 pass straight through the switch 1.

A further embodiment of the invention, illustrated in FIGS. 15 and 16, relates to a switch which is particularly adapted for rearward transfer and is provided with a longer receiving track portion. This special switch, which can also be mounted both horizontally and vertically, comprises additional contact arrangements externally mounted thereon which simultaneously fulfill a number of functions. Apart from serving to transfer, horizontally or vertically, the self-propelled and automatically controlled transport cars or carriages, as already described, this switch can also transfer these cars to a long layover track section or to a single track branch of the conveyor installation.

With the previously considered track switches the displaced track support 1 or 1' was returned to its home position as soon as the departing carriage passed over a monitoring contact (N, D) on the receiving track which also signaled occupancy of that track. However, in order that the switch need not wait for too long a time in its off-normal position until a transferred carriage has arrived at the end of a branch or siding or a long layover track, there is provided a special contact immediately beyond the switch which enables an immediate restoration of the switch to normal.

Now, when this transferred carriage is to return rearwardly over the receiving track section to the transfer switch, special signaling means must be provided for this purpose. More specifically, the carriage should travel toward the transfer switch without premature shifting of the slider thereof, which may be located at a considerable distance from the layover site, hence this car or carriage should trigger the switch drive just shortly before it reaches the switch. In this manner it is possible to prevent a backing up of conveyor cars traveling upon the main line, with no unduly long occupancy of the waiting zone at the main line in front of the displaced switch. This feature is indispensable in conveyor installations having a high transit frequency or large traffic volume.

In the system of FIGS. 15 and 16 the transport cars or carriages 11 arriving at the switch 1 are again scanned by the aforedescribed sensor 27. If the code detected by the sensor causes the switch 1 to shift, the car 11 is transferred to the receiving track section 4 and, after moving off the switch 1, arrives at a stop 43 at the end of an extension 4' of the receiving track section 4 which includes several internally insulated current-rail pieces 44, in line with a pair of rail sections 54, 55 adjoining the bus bars 413, 414, so that the current collector or brush 48 is de-energized and the drive of the car 11 is stopped.

When the receiving track section 4' is full, the last car 11 remains standing upon a monitoring contact O (cf. FIG. 3) which signals the busy condition to the control device 28, so that no further cars can move onto the receiving track 4.

In order that the cars 11 located upon the receiving track section 4, 4' can again be transferred to the main line or track 2 without manual removal and replacement, I provide special signaling means as will now be fully explained.

A start button 40 (cf. FIG. 13) is located at the receiving rail or track section 4' for reversing the movement of a car 11 standing on this section. By means of the depressed start button 40 the drive motor of the car 11 receives a voltage of reversed polarity by way of the current rail 44, so that it can start moving backward.

In the event that cars 11 are just moving over and past the switch 1 and a car 21 which is to be retransferred is approaching the switch 1, fouling of the equipment could occur if the switch 1 is occupied when its shuttle 25 is displaced. Thus, the displacement of the shuttle 25 is to be retarded as long as cars 11 are located on the shuttle 25 or in the vicinity thereof.

For this purpose, a set of control contacts U', V', W' signal the presence of transport cars 11 immediately in front of, upon or just beyond the switch 1 to the control device 28 whereupon the shifting of the switch 1 is inhibited. These control contacts are advantageously small switches having feeler levers or antennas 47 responsive to cars moving past. Furthermore, a waiting zone 413', 414' is provided in front of the switch 1' at the receiving track section 4 in the case of rearward transfer. The cars 11 stop at this waiting zone 413', 414' when the shifting of switch 1 is inhibited. As soon as the switch 1 is again free, its shuttle 25 is displaced by the aforedescribed recall switch P' which has been passed over by a car and which then delivers to the control device 28 of the switch 1 the command signal to displace the switch. The monitoring contacts U', V', W' are, of course, ineffectual in the unoperated state of signaling means P' in order that the shuttle 25 may be free to move with a car thereon as described above.

Shuttle 25 is driven by the drive motor 29, through the intermediary of the crank disk 36 described in connection with FIG. 4, and is guided in ball bearings 41 for translatory movement. Upon its displacement into the pick-up position aligned with track 4, the control circuit 28 for the switch 1 re-energizes the bus bars 413, 414 in the waiting zone of track 4 and the car halted in that zone moves onto the current rails 113, 114 of the shuttle which are likewise reversed in polarity. In order that the car 11 should not overshoot the slider, it is necessary to provide same with a monitoring contact 57 in order to deliver to the control circuit the command to return the shuttle to its home position. This contact 27 can be acuated in both directions of travel.

The monitoring contact 57 is advantageously so designed that also, if desired, two cars 11 can travel rearwardly towards the switch 1 without interference. As soon as the first car has reached the contact 57, there is initiated a separation of the two cars, the control circuit 28 transmitting a command to the second car 21 directing it to travel back toward the stop 43.

The current rails 413, 414 are normally so poled that a car 11 always travels toward the stop 43'; thus, in the event that a car during loading or unloading comes into contact with an energized rail section, it is not able to move in the direction of the switch 1. Proper correlation of the contacts U', V', W', 57, P', O, 47 with the waiting zones of the current rails 413, 414, 54, 55, 44, in conjunction with the intervening insulation 51, enables trouble-free automatic operation of the transfer procedures, both horizontally and vertically.

Advantageously, the conveyor installation according to my invention can be equipped with a tilting or dumping station, by means of which the cars of their containers can be automatically emptied at the receiving station. Furthermore, the aforedescribed transfer switch can be advantageously used as the tilting or dumping device, so that pivotal movement of the mobile track support occurs instead of a sliding motion. The installation, triggering and control of the tilting station are analogous to those of the transfer switches. More specifically, if a transport car or carriage arrives at a dumping station and if the reading means thereof respond to the code markings on the car, then the latter is halted and any following cars are stopped in front of that station. The mobile track support of the dumping station is then tipped about an axis. The car is immobilized on the support during the tilting movement so that the conveyed goods can fall out.

After unloading, the empty cars must again return to their home station or place of origin. The tilting or dumping motion of the track supports can be performed by a parallel linkage which swings the support sharply to one side so that the cars are partly overturned. After completion of this operation—which takes little time—there takes place the return swing and righting of the track support together with the transport car which thereupon continues on its way while assuming its normal erect position. With the carriage wheels 19 positively engaged by the channel-shaped rail section 26 as described in connection with FIGS. 1 and 2, and with the carriage immobilized on the tiltable support by a short-circuiting of its motor armature as likewise described above, the carriage will be securely held during the dumping operation.

Figure 17:
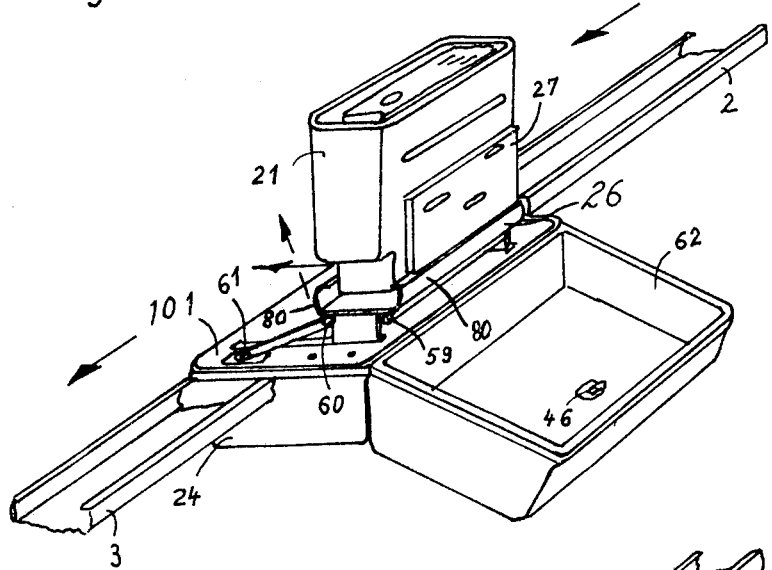
FIG. 17 is a fragmentary perspective view showing details of a tilting station for dumping the conveyed material.
Figure 18:
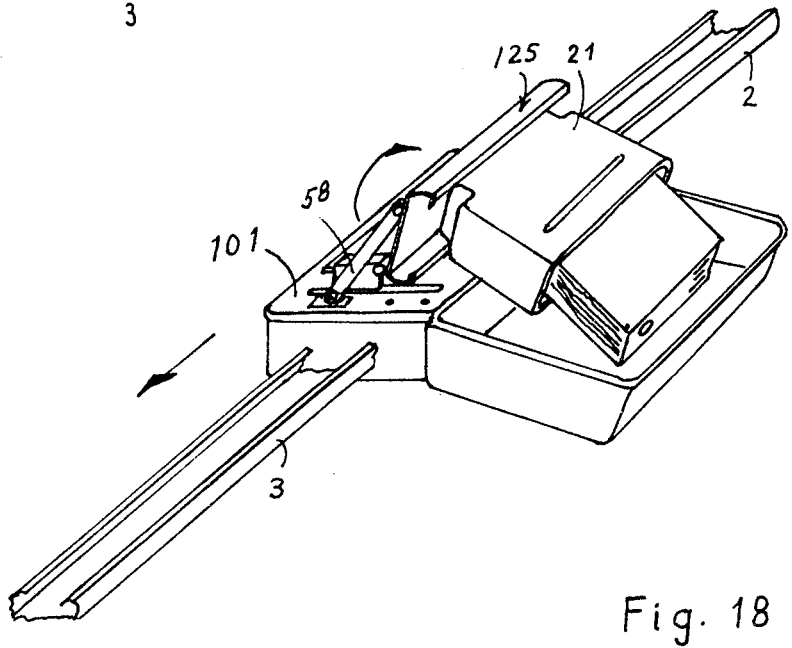
FIG. 18 shows the tilting station of FIG. 17 during an unloading operation.

According to FIGS. 17 and 18, the tilting or dumping station shown therein in perspective incorporates a tiltable support 101 provided with a receiving trough or container 62 into which the conveyed material drops out of the transport cars 11. When the scanning or reading means 27 responds to the code markings of a car 11, the latter will be electrically stopped on a support 125, in the manner already described, whereupon a pair of parallel links 58 (only one shown) begin to move. Since the rocker arms 58 are hinged to the housing 24 at 61 in such a manner as to tilt the support 125, hinged thereto at 60, together with the car 11 immobilized on its track section 26, the support 101 is swung about a generally horizontal pivotal axis 59. As a result, the conveyed material drops into the receiving trough 62 and after a certain period of time the return swing is automatically triggered by the control circuit 28. An additional monitoring contact 46, responsive to the degree of filling of receptacle 62, prevents overflow thereof by inhibiting the operation of the dumping mechanism in housing 24.

A considerable advantage resides in the fact that it is possible to get along with very few self-propelled cars in a conveyor installation according to my invention, the system insuring that the cars will quickly return to this home station or place of origin. The tiltable support according to FIGS. 17 and 18 is especially useful at those stations which are destined to receive a large amount of conveyed goods or materials but do not have much outgoing traffic.

With larger conveyor installations it is advantageous to provide an alarm system to indicate improper operation. Thus, conventional control lamps may be disposed at convenient locations of the installation to light up in order to indicate trouble or breakdown.

Accordingly, each of the aforedescribed switches may be provided with extra contacts for verifying their correct operation by signaling, for instance, the following situations: defect in the switch motor, short circuit in the power supply, sticking or jamming of a transport car, loss of power, occupancy of the receiving track, and so forth. To this end the switch housing may contain further contacts transmitting the signals to a control panel for monitoring disturbances with the aid of suitable control lamps. From this location the disturbance signals can be delivered to a wireless alarm system serving to alert a mechanic or other technical-service personnel for quickly remedying the defect.

Such a wireless transmitter, indicated diagrammatically at 99 in FIG. 3, may thus be controlled by the control circuit or mechanism 28 to signal any of the aforementioned conditions (e.g. nonfunction of switch motor 29, as determined by a prolonged reversal of limit switch X without reversal of limit switches Y and Z) to a receiver 98 situated at any convenient location. The receiver in turn, energizes a control panel 97 to alert an operator.

What is claimed is:
1. In a transportation system, in combination:
   track means including a fixed primary track section and a fixed secondary track section juxtaposed at a junction point;
   transfer means at said junction point provided with a mobile track section alternately alignable with said primary track section and with said secondary track section in a normal position and an off-normal position, respectively, of said transfer means;
   at least one carriage displaceable along said track means, said transfer means being capable of supporting said carriage on said mobile track section during movement between said normal and said off-normal position thereof;
   motor means on said carriage for propelling same along said track means;

drive means for reciprocating said mobile track section between said normal and off-normal position;

first control means operative upon arrival of said carriage on said mobile track section for immobilizing said carriage and starting said drive means to move said mobile track section to said off-normal position;

second control means operative upon arrival of said mobile track section in said off-normal position for arresting said drive means and releasing said carriage for travel onto said secondary track section;

third control means operative upon arrival of said carriage on said secondary track section for restarting said drive means to return said mobile track section to said normal position; and monitoring means responsive to the presence of said carriage on said track means at predetermined locations in the immediate vicinity of said transfer means for inhibiting the operation of said drive means.

2. The combination defined in claim 1 wherein said transfer means includes a second mobile track section rigidly connected with the first-mentioned mobile track section for simultaneous displacement therewith, said second mobile track section being aligned with said secondary track section in said normal position and disaligned with both fixed track sections in said off-normal position.

3. The combination defined in claim 2 wherein said secondary track section is duplicated on opposite sides of said junction for forming a throughgoing track, said monitoring means being located along said throughgoing track and on said second mobile track section.

4. The combination defined in claim 1, further comprising fourth control means operable in the absence of said carriage from said mobile track section for starting said drive means to move said mobile track section to said off-normal position for receiving said carriage from said secondary track section.

5. The combination defined in claim 4 wherein said primary track section is duplicated on opposite sides of said junction for forming a throughgoing track, said monitoring means being located along said throughgoing track and on said mobile track section, said fourth control means including signaling means responsive to the presence of said carriage on said secondary track section for making said monitoring means effective.

6. The combination defined in claim 1, further comprising arresting means coupled with said drive means for immobilizing said carriage on either of said fixed track section upon disalignment of said mobile track section therewith.

7. The combination defined in claim 6 wherein said motor means comprises a direct-current armature with constant excitation, said track means including a pair of conductors on each of said track sections normally energized with a voltage difference of predetermined polarity, said carriage being provided with contact means for connecting said armature across said conductors, said arresting means including circuitry for altering the energization of the conductors of said fixed track section.

8. The combination defined in claim 7 wherein said fixed track sections include a descending track section, said circuitry including switchover means for reversing the polarity of said voltage difference on the conductors of said descending track section.

9. The combination defined in claim 8 wherein said circuitry further includes resistance means in series with said switchover means for maintaining the flow of reverse current through said armature at a magnitude just sufficient to stabilize said carriage against gravity on said descending track section.

10. The combination defined in claim 1 wherein said first control means comprises relay means for short-circuiting the conductors of said mobile track section while energizing said drive means.

11. The combination defined in claim 10 wherein said third control means includes carriage-operated contact means on said secondary track section for operating said relay means.

12. The combination defined in claim 11 wherein said secondary track section is duplicated on opposite sides of said junction, said contact means including individual contacts on each of said sides.

13. The combination defined in claim 12 wherein said individual contacts are interconnected to prevent operation of said relay means upon simultaneous actuation thereof by respective carriages.

14. In a transportation system, in combination:

a rail-forming track comprising a pair of longitudinally extending parallel conductors normally connected to D-C potential;

at least one carriage displaceable along said track, said carriage including a motor and contact means engageable with said conductors for energizing said motor;

branching means on said truck including a movable track section having a normal position and an off-normal position, said track further including a first fixed section leading to said movable section, a second fixed section continuing beyond said movable section and aligned therewith in said normal position thereof, and a third fixed section aligned with said movable section in said off-normal position thereof;

mechanism for displacing said movable section between said normal and said off-normal position;

first control means for selectively actuating said mechanism during presence of said carriage on said movable section;

first switch means responsive to said first control means for de-energizing said movable section in its normal position immediately prior to operation of said mechanism and for re-energizing said movable section upon arrival thereof in its off-normal position whereby said carriage is actuated to move onto said third fixed section;

second control means for selectively actuating said mechanism during presence of said carriage on said third fixed section whereby said movable track section is displaced from said normal to said off-normal position to line up with said third fixed section;

and second switch means responsive to said second control means for reversing the polarity of energization of said third fixed section to return said carriage to said movable section in the off-normal position thereof, said first switch means being controllable by said second switch means to de-energize said movable section during return thereof to said normal position and to re-energize said movable section upon arrival thereof in its normal position whereby said carriage is actuated to move off said movable section.

15. The combination defined in claim 14 wherein said first and second fixed sections form a throughgoing line with said movable section in said normal position, said movable section being reciprocable by said mechanism in a direction perpendicular to said throughgoing line.

16. The combination defined in claim 14 wherein said first control means includes switch contacts responsive to the position of said movable track section independently of the electric power supply for actuating said mechanism in a sequence of operations unaffected of any temporary power failure.

17. The combination defined in claim 14, further comprising alarm means operable by said switch contacts upon prolonged interruption of said sequence of operations.

18. The combination defined in claim 14 wherein said alarm means includes a wireless signal transmitter.

19. The combination defined in claim 14 wherein said motor is provided with a constant excitation and with an armature connectable by said contact means across said conductors, further comprising circuitry coupled with said mechanism for altering the energization of any of said fixed sections upon disalignment of said movable section therewith to immobilize a carriage positioned thereon.

20. The combination defined in claim 19 wherein said first fixed section forms a path for said carriage descending toward said branching means, said circuitry including switchover means for reversing the polarity of said potential on said first fixed section.

21. The combination defined in claim 20 wherein said circuitry further includes resistance means in series with said switchover means for maintaining the flow of reverse current through said armature at a magnitude just sufficient to stabilize said carriage against gravity on said descending path.

22. The combination defined in claim 14 wherein said first control means comprises selector means settable to a multiplicity of code combinations on said carriage and test means adjacent the entrance end of said movable section positioned to respond to a predetermined code combination of said selector means upon passing of said carriage onto said movable section, said selector means and test means including respective markers establishing a reading position upon registering with each other, said mechanism being actuatable by said test means upon nonrecognition of said predetermined code combination in said reading position.

23. In a transportation system, in combination:
a track provided with channel-shaped rail means including a pair of conductors, said track being provided with a fixed section and a tiltable section;
a carriage displaceable along said track, said carriage having wheels positively engaged by said rail means, said carriage being provided with a direct-current motor for propelling same along said track, said motor having a constant field excitation and an armature with contacts engaging said conductor for energization thereby;
mechanism for swinging said tiltable section about a generally horizontal axis, said carriage being provided with a container for goods to be unloaded by such swinging upon said carriage standing on said tiltable section;
and control means operative upon arrival of said carriage on said tiltable section for actuating said mechanism, said control means including circuitry for short-circuiting said conductors upon said carriage arriving on said tiltable section whereby said motor is braked to standstill.

24. The combination defined in claim 23, further comprising a receptacle for the unloaded goods adjacent said tiltable section, said receptacle being provided with signaling means responsive to a predetermined degree of filling of said receptacle for inhibiting the operation of said mechanism.

References Cited

UNITED STATES PATENTS

| | | | |
|---|---|---|---|
| 761,877 | 6/1904 | Clark | 104—151 |
| 904,525 | 11/1908 | Frederick | 105—29 |
| 2,135,230 | 11/1938 | Courtney | 104—76 |
| 2,166,752 | 7/1939 | Cullen | 191—23 |
| 3,173,533 | 3/1965 | Zuck | 104—88 X |
| 3,306,428 | 2/1967 | Harrison | 104—88 X |

DRAYTON E. HOFFMAN, Primary Examiner